United States Patent
Feeley et al.

[15] 3,657,724
[45] Apr. 18, 1972

[54] METHOD OF AND POWER SUPPLY FOR ELECTRIC ARC WELDING

[72] Inventors: Albert G. Feeley; George G. Landis, both of Chagrin Falls, Ohio

[73] Assignee: The Lincoln Electric Company, Cleveland, Ohio

[22] Filed: Oct. 24, 1969

[21] Appl. No.: 869,091

[52] U.S. Cl. ................................. 219/131 R, 219/137
[51] Int. Cl. ............................................. B23k 9/10
[58] Field of Search ............... 219/137, 131; 307/100, 104, 307/106

[56] References Cited

UNITED STATES PATENTS

| | | | |
|---|---|---|---|
| 2,628,330 | 2/1953 | Williams | 315/200 |
| 3,099,789 | 7/1963 | Perrins | 323/9 |
| 3,078,362 | 2/1963 | Steinert | 214/137 X |
| 3,249,735 | 5/1966 | Needham | 219/131 |
| 3,291,960 | 12/1966 | Folkhard et al. | 219/131 |
| 3,440,395 | 4/1969 | Rebuffoni et al. | 219/131 |
| 3,423,564 | 1/1969 | Sevenco | 219/131 |

FOREIGN PATENTS OR APPLICATIONS

617,644  2/1944  Great Britain ..................... 219/73

Primary Examiner—J. V. Truhe
Assistant Examiner—George A. Montanye
Attorney—Meyer, Tilberry and Body

[57] ABSTRACT

Electric power supply for arc welding of the drop transfer type with a small diameter electrode which changes its dynamic characteristics when the drop short circuits the electrode to the weld pool. The supply is a DC power source having a short circuit current rate of rise greater than 100,000 amperes per second in series with an inductive choke which substantially reduces the rate of rise.

Two circuits, each including a generally low resistance and/or low inductance and each including an appropriately polarized diode, are each in electrical parallel with the inductive choke. One circuit functions to increase the short circuit current rate of rise when the drop contacts the weld pool and the current starts to rise. The other absorbs the inductive energy in the choke when the short is broken and the current starts to decrease.

13 Claims, 9 Drawing Figures

Patented April 18, 1972

INVENTORS
ALBERT G. FEELEY
BY GEORGE G. LANDIS

Meyer, Tilberry & Body

ATTORNEYS

Patented April 18, 1972  3,657,724

INVENTORS
ALBERT G. FEELEY
BY GEORGE G. LANDIS
Meyer, Tilberry & Body
ATTORNEYS

ARC VOLTAGE

ARC VOLTAGE

FORWARD DIODE CURRENT

CHOKE I VOLTAGE

FORWARD DIODE ONLY

ARC VOLTAGE

ARC VOLTAGE

FORWARD DIODE CURRENT

CHOKE I VOLTAGE

TIME (SECONDS)
REVERSE DIODE CURRENT

FORWARD & REVERSE DIODE

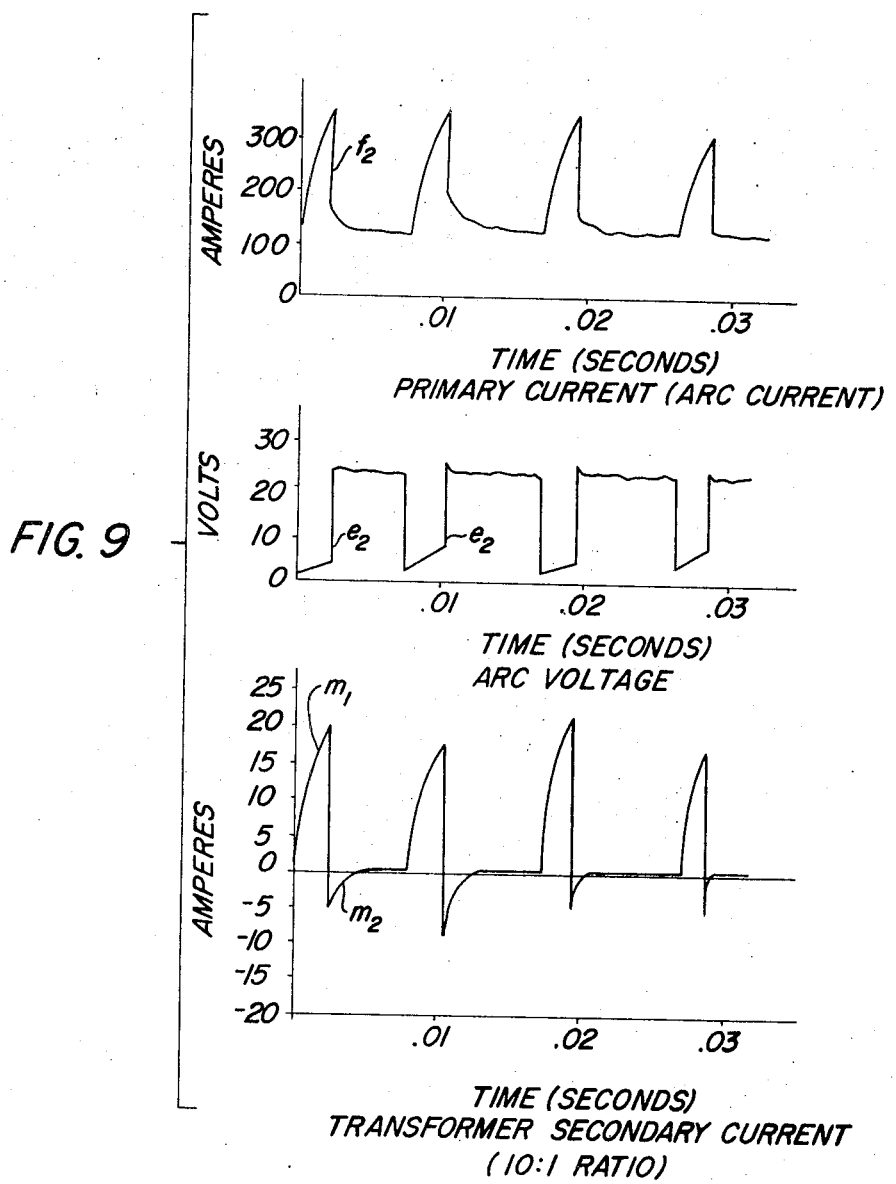

METHOD OF AND POWER SUPPLY FOR ELECTRIC ARC WELDING

This invention pertains to the art of electric arc welding and, more particularly, to a method of and power supply for electric welding.

The invention is particularly applicable to out-of-position automatic and semi-automatic electric arc welding of metals using relatively small diameter electrodes, and will be described with particular reference thereto, although it will be appreciated that the invention has other and broader applications.

By "automatic welding" is meant feeding a welding electrode of indefinite length past an electric contact forming part of a welding head toward the workpiece to be welded. The contact is usually spaced anywhere from one-fourth to 1-¾ inch from the workpiece, although it can be more. The portion between the contact and the electrode end is referred to herein as the "electrode extension." The invention is generally limited to electrodes having a current carrying cross section between 0.0005 square inch and 0.0050 square inch; either solid or tubular.

By "out-of-position welding" is meant welding in other than the downhand position, e.g., either vertical or overhead. Such welding presents a problem in that the weld pool must remain rather small and not be heated too much above the melting temperature of the metal of the workpiece. If it is, the molten metal becomes too liquid and runs out of the weld pool. Furthermore, some means other than gravity must be employed to move the metal from the electrode end to the molten weld pool.

The arc may be protected from the atmosphere by any desired means such as: the melting and vaporization of the core of a cored electrode or of an external coating or granular flux; gas shielding either $CO_2$, inert gas, or mixtures of inert and active gases or a combination of any of the above.

BACKGROUND

In the art of arc welding, metal is transferred from the electrode to the workpiece by one or the other of two general mechanisms. The first is when a molten droplet forms on the end of the electrode, breaks off and transfers by free flight from the electrode end to the workpiece. This is called "spray transfer." Spray transfer is usually characterized by a continuous high current sufficient to pinch off the molten droplets on the electrode end as rapidly as they are formed. This high arc current is unsatisfactory for out-of-position welding because the high heat generated by the arc makes the weld pool too hot and thus too liquid. Also in out-of-position welding, transfer of the metal from the electrode to the weld pool is inefficient.

The second mechanism is where a molten droplet forms on the end of the electrode, contacts the weld pool, breaks off and is drawn into the weld pool by the surface tension of the molten metals. This is called "drop transfer." The present invention deals with this drop transfer mode of metal transfer to the molten weld pool.

The drop transfer method creates certain problems because at the instant the droplet contacts the weld pool, a short circuit is made across the power source which continues until the droplet is separated from the electrode. High speed movies indicate that during this shorted period the arc goes out. When the droplet breaks away, the arc is re-established and the sequence repeats itself.

High speed oscillograms reveal that the instantaneous currents and voltages supplied to the electrode are quite different from that shown by the typical d'Arsonval ammeter or voltmeter. These oscillograms indicate that when using a constant voltage power source, and when there is an arc, the current decays exponentially from 300–400 amperes to 50–80 amps. and the heat from the arc melts both the workpiece to form the weld pool and the electrode end to form the molten droplet. When the droplet touches the weld pool, the resultant short circuit causes the voltage between the electrode end and the weld pool to instantaneously drop to essentially zero and the current rises exponentially toward a much higher value at a rate of rise determined primarily by the parameters of the power source. This current rapidly heats both the droplet and the electrode extension until finally some portion of this droplet or the extension breaks away like a fuse at which time the arc gap is reestablished. The minimum current at which this fuse break occurs is, of course, dependent somewhat on the current carrying area of the electrode, being on the order of 300 amperes for an area on the order of 0.0008 square inch and somewhat greater for an electrode having a current carrying area in the order of 0.005 square inch. Once the break occurs, the current falls at a rate determined by the parameters of the power supply exponentially toward a final value determined by the rate of wire feed and other parameters of the circuit. These oscillograms also show that the rapid drop in current when the arc gap is reestablished generates a voltage in any inductance of the power supply which voltage is additive to the power source open circuit voltage and appears across the new arc gap. This "inductive voltage," being generated by the rate of change of the current, also decays exponentially with the decay in the current in the arc gap.

The short circuit current rate of rise, the maximum current which is reached before the arc is reestablished, and the rate of decay of the current when the arc gap is reestablished all have a substantial effect on the ability to obtain satisfactory welds under varying conditions and particularly in out-of-position welding.

If the rate of rise of the current when the droplet shorts to the weld pool is relatively low, then the time required for the current to rise to a value necessary to cause the fuse break is long, and the electrode extension also tends to heat such that the break may occur in this extension rather than in the molten droplet. When the break occurs in the extension, the new end of the electrode is further from the weld pool than it would have been if the break had occurred in the droplet and a longer time is required for the next short circuit to occur. Because of this longer time, the molten droplet that forms on the end of this advancing electrode becomes much larger than it would have been if the break had occurred closer to the weld pool. Also, the arcing time is increased resulting in a higher heat input to the weld pool.

It can be noted at this point that this problem of a low rate of rise only exists with the small diameter electrodes as used in semiautomatic welding. With stick welding the electrode diameter is substantially greater and is much more able to carry the short circuit current without the fuse break occurring in the electrode wire itself.

If the maximum short circuit current reaches too high a value, then when the fuse break does occur, it does so with an explosive effect, sometimes sufficient to blast the molten metal out of the weld pool, but, in any event, creating spatter which is not only wasteful of valuable weld metal but is unsightly and difficult to clean up. Also, a high maximum current results in a higher average current during the arcing period.

The maximum current reached before the fuse break occurs, together with the rate of decay of the current after the arc gap is reestablished, together with the length of time before the next short circuit occurs determine the energy input to the arc. If the maximum current is high and the rate of decay is slow, the energy input to the arc is high. A high energy input to arc unduly heats the weld pool making it so molten that in out-of-position welding the metal will flow out of the pool and no weld or an inferior weld results.

The desiderata which determines the rate of rise of the current and the rate of decay are determined primarily by the inductance either internal or supplementary, or both, of the power source. Thus, if the inductance is relatively high, the rate of current rise and decay is relatively low and the energy input during the arc period will be relatively high. If the inductance is low, the rate of current rise and decay will be much faster and the average energy input during the arc period will be much lower.

These desiderata are easily illustrated by reference to FIGS. 1 and 2 of the drawings which are oscillograms of the currents and voltages plotted against time of a 0.035 inch electrode advancing at the same constant rate toward a workpiece energized by a constant voltage power source having an open circuit voltage of 18 volts and a short circuit rate of current rise for FIG. 1 of approximately 70,000 amperes per second and for FIG. 2 of approximately 100,000 amperes per second.

In FIG. 1, curves a and b are the instantaneous voltages and currents respectively. Curves a and b show that just before the short circuit the arc voltage is approximately 24 volts and the current 100 amperes. At the moment of short circuit, the voltage drops to approximately zero and the arc current rises exponentially to 300 amperes in approximately 0.01 second. During this time, due to the increasing resistance of the electrode extension as it heats, the voltage rises to between 4–6 volts. When the fuse break occurs, the arc voltage rises instantaneously to approximately 28 volts, which is the static voltage of the generator at the arc current plus the voltage of self-inductance and thereafter decays exponentially in the next 0.025 second to approximately 24 volts while the current decays exponentially from approximately 300 amperes to 100 amperes.

In FIG. 2, curves c and d show the voltages and currents respectively, which curves show that just before the short circuit, the voltage and arc current are approximately the same as in FIG. 1. At the moment of short circuit, the voltage again drops to approximately zero and the current rises exponentially to 450 amperes. When the fuse break occurs, the voltage rises to 28 volts and the current in the next 0.01 second decays from 450 amperes to 80 amperes and the process then repeats itself.

Several fundamental phenomena are evident as a result of a study of these two oscillograms. As the electrodes in both instances are advancing at the same speed, the time required for the nearly established end of the electrode to come into contact with the weld pool is an indication of the location of the fuse break. Thus, in FIG. 1 the relatively long arcing time indicates that the fuse break occurred in the extension, not in the droplet. Also, the relatively high arc current and the relatively long arc period create problems in the control of the weld. Heat is added to the weld puddle during the arc period, and this high average current and long time period make the puddle too hot and, thus, too fluid. Furthermore, the high arc current in the small diameter electrode leads to $I^2R$ heating in the electrode extension and this is conducive to the formation of a much larger droplet on the end of the electrode which only compounds the difficulties when the next short occurs. Thus, with a large droplet the area of contact with the electrode end is larger and the heating due to the short circuit current occurs more readily in the electrode extension than in the droplet. Also, the weld pool has a cooling effect on the droplet and with the larger droplet this cooling effect is greater.

In FIG. 2 the short circuit current rises to a peak substantially higher than the 300 amperes required to cause the fuse break. This is due to the fact that this particular power source has a relatively high maximum short circuit current and the fuse break requires a finite time to occur because of the mechanical forces involved.

Also, FIG. 2 shows that because the current decays exponentially from a much higher value than is necessary to cause the fuse break, the average current during the arcing period is still higher than necessary to maintain the arc. This higher average current during the arcing period causes problems with the fluidity of the weld pool. It is, of course, possible to reduce the open circuit voltage of the power source so that the arc pops out prior to the occurrence of the next short circuit with a resultant shorter arcing period. This improves the control of the weld pool, but spatter still remains a problem. It will thus be seen that for each welding application it is possible to balance the spatter problem and the heat introduced to the weld pool by appropriately selecting a power source having a rate of current rise which will satisfy the particular conditions of the welding operation. This may also be done by providing a single power source and adjusting its internal inductance or by providing a power source with a high rate of current rise and adding inductance in its output circuit.

Various ways have been proposed in the past to overcome these problems and provide a relatively spatter-free welding operation with proper control of the weld pool temperature.

U.S. Pat. No. 2,886,696, uses a constant potential power source with an open circuit voltage less than that required to sustain the arc and then adjusts the inductance of the circuit relative to the welding current so that the induced voltage maintains the arc and the number of short circuits occurring each second is in excess of 50 and usually above 100. This method involves careful correlating of the inductance and arc current which sometimes is critical and difficult for the operator in the field to adjust. Also, because the peak short circuit current is high, the average current is necessarily high.

In an effort to reduce this average current, this patent also proposes to either further lower the inductance or the open circuit voltage so that the arc actually goes out between short circuits. This results in an uneven or lumpy weld bead or, even worse, "cold shuts," i.e., where the weld bead is not fully fused to the workpiece.

U.S. Pat. No. 3,071,680, provides a DC keep alive power source which maintains an arc at a relatively low arc current sufficient to form a molten droplet on the end of the advancing electrode. A supplementary power source in parallel therewith supplies a series of timed current pulses of a high enough current to cause the molten droplets formed by the keep alive arc to be pinched off and transferred to the weld pool by spray transfer. These pulses are provided at sufficiently close time intervals that the molten droplet forming on the end of the electrode never has time to contact the molten weld pool and thus short circuit the keep alive power supply. There is a continuous arc, which, in combination with the additional heat from the timed pulses, tends to overheat the weld pool and make it too liquid. Also, transfer of metal from the electrode to the weld pool is difficult in out-of-position welding.

U.S. Pat. No. 3,249,735, is somewhat similar to U.S. Pat. No. 3,071,680, except that in some embodiments an impedance is placed in series with the welding electrode which is then periodically shorted out at timed intervals so as to result in a periodic spray transfer of the weld metal to the weld pool. The power supply must be critically adjusted so as to operate without creating a high enough average current to overheat the weld pool.

In the case of these last two patents, no short circuiting occurs at any time and the number of high current pulses is repeated at a fixed frequency, usually either line frequency or a multiple thereof. This is done by making the supplementary power source an alternating current transformer having either half wave or full wave rectification and without using any filtering in the output of the rectifiers.

U.S. Pat. application Ser. No. 652,204, filed July 10, 1967, now Pat. No. 3,502,897, and its continuation-in-part application Ser. No. 738,748, filed June 20, 1968, now abandoned, and owned by the assignee of this application, discloses an improved arrangement over these above patents. In these applications a principal power source having a short circuit current rate of rise less than 60,000 amperes per second is provided in parallel with a second or supplemental power source having a short circuit current rate of rise in excess of 100,000 amperes per second. The two power sources have generally flat volt ampere output curves and the voltage outputs during welding are so interrelated that the principal power source supplies current at all times while the supplemental power source supplies no or a very low current during periods of arcing. When the droplet contacts the weld pool and short circuits the two power sources, the supplemental power source, because of its high rate of short circuit current rise, supplies a short burst or pulse of current sufficient to and of long enough duration to quickly cause a fuse break and reestablish the arc. These different rates of rise result from a relatively high internal inductance in the principal power source and a relatively lower internal inductance in the supplemental power source. The important difference between this power source and the prior art is the occurrence of the pulses at an irregular frequency determined solely by conditions at the arc, i.e., the frequency of the shorts, and the ability to control the maximum current in the arc.

U.S. Pat. No. 3,291,960, employs either (1) a main choke in series with an auxiliary choke paralleled by a resistance or (2) a main choke paralleled by a plurality of auxiliary chokes, each having a resistance in series therewith. In both arrangements, current flows in each branch at all times. The effect is to change the short circuit current rate of rise and to limit the maximum short circuit current.

In one embodiment of the second arrangement a diode conducts current at all times to the auxiliary inductors except when the short circuit is broken and the current starts to decrease at which time the diode prevents the inductive energy of the main inductor leaking off through the auxiliary inductors.

Selection of the circuit components is critical and the change in short circuit current rate of rise is gradual and difficult to obtain optimum values for a full range of welding conditions.

Arc welding must be performed under a variety of widely differing conditions, e.g., different diameter electrodes; different angles of the workpiece surface; different shielding mediums; different workpiece thicknesses, different metals; different currents; different voltage; different types of metal transfer; all of which may require widely differing dynamic characteristics of the power supply. Such characteristics heretofore have in many cases differed so widely that frequently one power supply was incapable of adapting to all of such conditions and a multiplicity of expensive and bulky power supplies were required.

The present invention contemplates an electric arc welding power supply comprised of a power source and means including switches which automatically change its dynamic characteristics in response to the dynamic requirements of the arc so as to have apparent characteristics which satisfy the requirements demanded of it by whatever welding process it is supplying at the moment.

THE INVENTION

In accordance with the broadest aspects of the invention, a power supply for arc welding is provided comprised of a power source having a relatively high short circuit current rate of rise in combination with both an inductive choke which substantially decreases this short circuit current rate of rise and means including a switch for automatically lowering the effective inductance of or by passing the choke when the output of the power source is short circuited and the current starts to rise and raises it when the fuse break occurs and the current begins to drop.

As an optional addition to the above, means including a switch are provided for automatically and briefly lowering the inductance of or shorting the choke either as or shortly after the fuse break occurs and the current begins to drop so as to dissipate any stored energy in the choke and cause the arc current to drop more rapidly.

In accordance with a narrower aspect of the invention, a power supply for automatic welding of the drop transfer type is provided comprised of a DC power source having a short circuit current rate of rise in excess of 100,000 amperes per second and preferably very much in excess of 100,000 amperes per second, an inductive choke in series with the output of the source sufficient to lower the short circuit current rate of rise to below 100,000 amperes per second and a fast acting switch in "electrical parallel" with at least part of the choke which acts to lower or bypass the inductance and increase the short circuit current rate of rise when the current starts to increase.

By "electrical parallel" is meant either: connected directly across the terminals of or taps on the windings of the choke or a winding magnetically coupled to such winding by transformer action.

The switch is normally non-conducting during periods of arcing so that the current characteristics are of a power supply having a high internal inductance and a low short circuit current rate of rise. However, when the droplet contacts the weld pool, current instantaneously starts to rise. This causes an inductive voltage to appear across the choke which has an extremely steep wave front, i.e., a high rate of rise, which voltage is used to actuate the switch. The switch or switches employed must have an essentially zero response time. An example of such a switch would be a solid state diode, triode or the equivalent. Such diodes have the characteristics of being non-conductive until the voltage across them exceeds a critical value, i.e., the forward breakdown voltage, at which point, they become fully conductive in a matter of microseconds, e.g., instantaneously. Triodes switched to conduction by an externally applied voltage may also be used. The switch when conductive bypasses current around the choke and the short circuit current rate of rise increases essentially instantaneously so that the current will rise more rapidly and cause the fuse break to occur sooner. When the fuse break occurs, the current instantaneously starts to drop. The switch automatically and essentially instantaneously becomes non-conductive to reestablish the lower short circuit current rate of rise. In effect, the power source supplies a short pulse of current at a high rate of rise sufficient to cause a fuse break but only during the short circuit.

The inductance of the inductive choke is additive to any other internal inductances of the power source, the power leads and the electrode. Its value to lower the short circuit current rate of rise to less than 100,000 amperes per second will thus depend on these other inductances as well as the desired short circuit current rate of rise for the particular welding operation involved.

The exact value of the inductances are not as important as the effect which they have on the short circuit current rate of rise which can only be determined by examining oscillograms of the current rise immediately following the establishment of the short circuit. The rate of rise, of course, decreases exponentially and for the purposes of this invention, the "short circuit current rate of rise" may be defined as "the rate of rise measured during actual welding in the first 100 to 150 amperes of rise from the current in the arc at the instant just before the short occurs."

In accordance with more limited aspects of the invention, the switch has a resistance in series therewith such as to limit the maximum short circuit current to that required to at least cause the fuse break but with the minimum of spatter. This may be done by appropriate selection of the value of the resistance, e.g., from 0.0 to 0.05 ohms. At the currents of arc welding, such small resistances exert a substantial effect on the dynamic characteristics of the power supply.

Further in accordance with limited aspects of the invention, the switch may also have an inductance in series therewith and/or may only be in electrical parallel with part of the windings on the inductive choke so as to leave some residual inductance in the circuit when the switch closes, which will then limit the short circuit current rate of rise to desired values.

Such residual inductance in accordance with the invention is from 0.0 to 50 microhenrys.

Further in accordance with another limited aspect of the invention, a second switch is in "electrical parallel" with at least part of the inductive choke which becomes conductive either essentially instantaneously or preferably momentarily after the fuse break occurs for the purpose of dissipating the stored energy in the choke and causing the current in the arc to fall more rapidly from the high current at fuse break.

The break of the short circuit into an arc is a somewhat slower process than the establishment of the short circuit and the wave front, i.e., the rate of rise of the inductive voltage is somewhat less than when the short circuit was established. The rise is employed to actuate the second switch, preferably a diode. While the first diode switch ceases to conduct immediately, there is a momentary finite delay before the inductive voltage exceeds the forward breakdown voltage of the second diode. During this brief interval the welding circuit sees a large inductance which assists and assures the reignition of the arc.

This second diode switch may have additional inductance and/or resistance in series therewith in amounts of from 0–15 microhenrys and 0.0 to 0.05 ohms respectively for controlling the rate of current fall.

The small amounts of inductance and resistance in each of the diode circuits can be adjusted to match the dynamic response of the power source with respect to the shorting and arcing periods which differ with each welding application.

More specifically, in accordance with the invention, a power supply for automatic electric arc welding is provided comprised of: a power source having a relatively constant static voltage output and a short circuit current rate of rise greater than 100,000 amps/sec. and preferably much greater than 100,000 amps/sec., in series with an inductive choke of sufficient inductance to lower the short circuit current rate of rise to less than 100,000 amperes per second, the choke being electrically paralleled by a shunting path which consists of small values of resistance and inductance in series with a solid state diode polarized in the direction of the flow of current.

The choke must have a sufficiently low resistance such that during steady state current flow during periods of arcing the voltage drop in the resistance is less than the forward blocking voltage of the diode so that all the welding current flows through the choke and none through the diode path.

When the forward blocking voltage of the diode is exceeded, it conducts and bypasses current around the choke. This effectively changes the dynamic impedance of the welding circuit by transferring the welding current from one path to another.

A second method of accomplishing the same end result can be achieved by providing a circuit in which the welding current has but one path, namely a series choke, the impedance of which is automatically switched to meet the instantaneous demands of the welding process. Thus, the winding of the choke forms the primary of a transformer, the inductance of which when the secondary is open circuited limits the rate of rise of current in the welding circuit to less than 100,000 amperes per second.

The secondary of the transformer has as its permanently connected load a solid state diode in series with a resistor. The diode is so polarized that an increasing current in the primary will induce a voltage in the secondary in the forward direction of the diode.

Steady state current in the primary of the transformer does not induce any voltage in the secondary so that no current flows in the secondary. However, when a droplet shorts to the weld pool so that there is a sudden increase in current in the primary, a voltage is induced in the secondary which overcomes the forward blocking voltage of the diode and the secondary becomes essentially short circuited through the diode and resistor thereby reducing the inductive impedance of the primary at a rate of change determined by the resistance of the secondary circuit, the turns ratio of the windings, and the leakage reactance. As the inductive impedance goes down the rate of rise of current of the welding circuit approaches the rate of rise of current of the power source thus providing a means of causing a rapid fuse break in the shorted droplet. When the fuse break occurs, a sudden diminishing of current in the primary changes the polarity of voltage in the secondary and the diode blocks any further secondary current thus immediately restoring the inductive impedance in the primary.

Further in accordance with another aspect of the invention, a second diode polarized oppositely to the first diode, is also connected in parallel with the secondary usually in series with a resistance so that the inductive energy in the primary is dissipated at a controlled rate and there is more rapid decay of arc current following reestablishment of the arc. The secondary of the transformer can have any turns ratio with the primary but for the purpose of using convenient circuit components in the secondary, the secondary should have approximately 20 times the turns that the primary has. However, the resistance of the secondary should be held to a minimum such that if no auxiliary resistance is used in series with the diode, maximum effect on the impedance of the primary may be obtained.

Making the choke the primary of a transformer enables the use of lower wattage resistor with a higher value of resistance because the value of the resistance is reflected back to the primary winding inversely as the square of the turns ratio. The currents flowing in the secondary diodes and resistances are also proportionately reduced.

Further in accordance with the invention a method of drop transfer arc welding using a DC power source having a short circuit current rate of rise substantially in excess of 100,000 amperes per second and an inductance in series therewith to give a short circuit current rate of rise less than 100,000 amperes per second is provided which comprises making a switch conductive to lower the effective inductance in the circuit at the instant that the drop contacts the weld pool until the arc is reestablished.

As an added feature the method contemplates shorting or lowering the inductance either instantaneously with or momentarily after the arc is reestablished to dissipate any stored energy in the inductance.

OBJECTS OF INVENTION

The principal object of the invention is the provision of a new and improved power supply for electric arc welding of the drop transfer type which enables improved welds to be readily obtained in either the down hand or out-of-position welding on thin sheet metal.

A further object of the invention is the provision of a new and improved power supply for electric arc welding of the drop transfer type which has less spatter than heretofore.

Another object of the invention is the provision of a new and improved power supply for electric arc welding of the drop transfer type which enables the average arc current to be adjusted to the proper value to obtain satisfactory welds under a variety of conditions.

Another object is the provision of a new and improved arc welding power supply which can be adjusted to be able to supply welding currents over a wide range of dynamic characteristics.

Another object is the provision of new and improved arc welding power supply which can be used under a maximum range of welding conditions.

Still another object of the invention is the provision of a new and improved power supply for electric arc welding of the drop transfer type having a choke in series with its output during the existence of the arc in combination with means for lowering the inductance of the choke by transformer action when the droplet contacts the weld pool so that the power source supplies a pulse of current to more rapidly break the short circuit.

Still another object of the invention is the provision of a new and improved power supply for electric arc welding of the drop transfer type which enables adjusting the weld pool temperature consistent with the welding application.

Still another object of the invention is the provision of a new and improved power supply for electric arc welding of the drop transfer type including a power source having a choke in series with its output during the existence of the arc in combination with switching means bypassing the choke through a preselected lesser impedance so that the power source exhibits a higher short circuit current rate of rise.

Still another object of the invention is the provision of a new and improved power supply for electric arc welding which has improved arc starting capabilities.

Still another object of the invention is the provision of a new and improved arrangement for the power supply to have a changing short circuit current rate of rise.

Still another object of the invention is the provision of a new and improved power supply for electric arc welding which may be used interchangeably and without adjustment (except for voltage) for either spray or drop type transfer of metal from the electrode to the weld pool.

Another object of the invention is a welding power supply which enables welding to be carried out using a lower average arc current but which more quickly reestablishes the arc when the shorted droplet breaks from the arc pool.

Another object is a welding power supply made up of a power source, a choke and a bypassing switch for the choke which is automatically closed when the electrode end is shorted to the workpiece.

Another object of the invention is the provision of a new and improved method of arc welding of the drop transfer type wherein a single power supply has a high impedance during the periods of arcing and a much lower impedance when the short circuits occur, so that the power supply supplies a pulse of current sufficient to break the short circuit quickly and reestablish the arc.

Another object of the invention is the provision of a new and improved power supply for arc welding wherein its inductance changes in response to changing conditions at the arc.

Still another object is the provision of new and improved welding power supply for arc welding wherein a switch lowers the inductance thereof when the drop on the end of the electrode touches the weld pool and increases it when the short circuit is broken and the arc current becomes steady.

The invention may take physical form in certain parts and arrangement of parts, preferred embodiments of which will be described in detail in this specification and illustrated in the accompanying drawings which form a part hereof and wherein:

FIGS. 1 and 2, previously referred to, are voltage and current oscillograms on a greatly enlarged time base of drop transfer type electric arc welding showing the instantaneous currents and voltages when using a power supply having a short circuit rate of current rise of 70,000 amperes per second and 100,000 amperes per second, respectively;

PREFERRED EMBODIMENT

Figure 3:
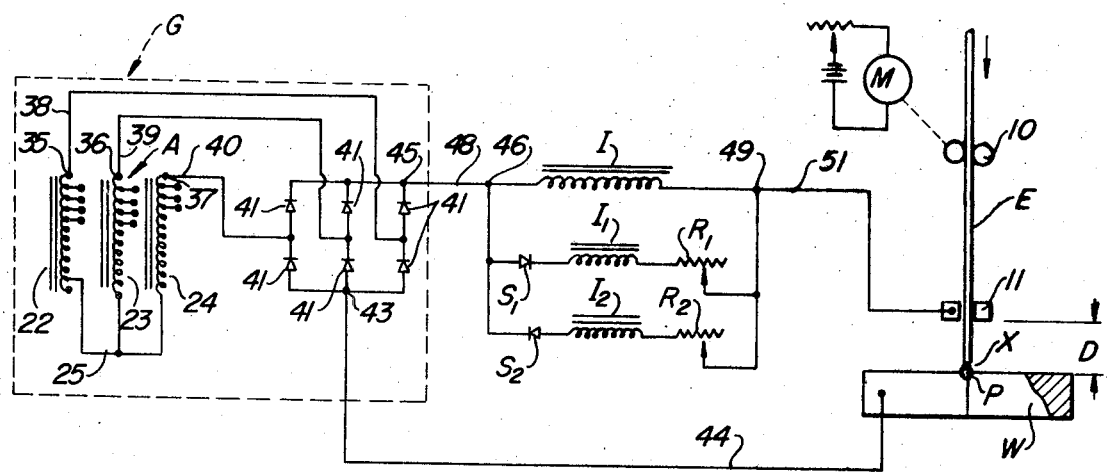
FIG. 3 is a schematic diagram of a power supply illustrating one embodiment of the invention.

Referring now to the drawings wherein the showings of FIGS. 3 to 9 are for the purpose of illustrating preferred embodiments of the invention only and not for the purpose of limiting same, FIG. 3 shows a DC power source G, supplying electric welding current to an electrode E and a workpiece W through a choke I. The choke is bypassed or paralleled by a first switch $S_1$ in series with a resistance $R_1$ and inductance $I_1$ and by a second switch $S_2$ in series with a second resistance $R_2$ and second inductance $I_2$.

The electrode E is a wire of indeterminate length and is fed towards the workpiece W by a pair of conventional feed rolls 10, driven as is conventional by an electric motor M. The electrode E moves past contacts 11 spaced a distance D from the workpiece W and an arc X is maintained between the end of the electrode E and the workpiece W, which arc both melts off the end of the electrode E and melts a weld pool P on the surface of the workpiece W. The workpiece W is shown as having its upper surface horizontal and the electrode E is shown as advancing in a perpendicular direction. Obviously, the electrode E may have any desired angle relative to the surface of the workpiece and the surface of the workpiece may have any desired angle relative to horizontal.

The distance D will in automatic welding be fixed and in semi-automatic arc welding will usually be maintained as accurately as the welding operator can maintain this distance. The distance D in practice may vary from one-fourth inch to 1-¾ inch although it can be greater. The distance is ordinarily referred to as the "stick out." The portion of the unmelted electrode beyond the contacts 11 is known as the "electrode extension."

The electrode E may be of any desired metal, e.g., aluminum, stainless steel, high alloy steel, but in the preferred embodiment is low carbon steel. The current carrying cross section may be as desired; for example 0.0005 sq. in. to 0.005 sq. in. but preferably on the order of 0.001 sq. in.

The electrode is advanced toward the workpiece by motor M which can be controlled by any of the conventional methods known in the art welding.

The power source G in the preferred embodiment and in accordance with the invention, has an output circuit voltage adjustable preferably between 15 and 55 volts, which voltage remains substantially constant at any adjusted value with variations in the steady state current in the output. Additionally, the power source G has a low enough internal inductance as to have a short circuit current rate or rise at least in excess 100,000 amperes per second and preferably very much in excess.

The power source G may take any one of a number of different forms, e.g., a battery which inherently has a low internal inductance, a DC generator so constructed as to have a low internal inductance; an alternating current transformer, the output of which is rectified; or an alternator, the output of which is rectified. In the event of a transformer or alternator, full wave rectification should be used and preferably the AC supply should be multiphase. In the event single phase alternating current is used, some means, either artificial or natural, must be provided to prevent the voltage from falling to zero. Artificial filtering cannot contain inductance, because, the short circuit current rate of rise of the basic power source would then be too low. In other words, the power supply includes a DC source having a ripple content not less than that of multiphase, full wave rectified AC.

In the preferred embodiment the power source G includes a three phase transformer A having the usual primary windings (not shown) and three Y-connected secondary windings 22, 23, 24. The transformer may be of any known type but is preferably one wherein the secondary windings 22, 23, 24 may be tapped to provide a variable voltage output of the source G in increments less than the volts per turn as is taught in copending application Ser. No. 702,592, filed Feb. 2, 1968, in the name of George G. Landis and assigned to the assignee of this application. These windings each have one output tap interconnected by wire 25 and one tap 35, 36 and 37 connected respectively by wires 38, 39 and 40 to the input terminals of six diodes 41 connected in a conventional three phase bridge rectifier circuit and having negative output terminal 43 connected to wire 44 to the workpiece W and a positive output terminal 45 connected to one terminal 46 of choke I by wire 48. The other choke terminal 49 is connected to the contacts 11 through wire 51. The switch $S_1$ may be any known type of fast acting electrical switching means capable of carrying the current involved but in the preferred embodiment switch $S_1$ is a solid state diode preferably of the silicon type although it can be of any of the commonly used types e.g. germanium, selenium or the like and has its negative terminal connected to wire 48 while the positive terminal is connected through resistance $R_1$ and choke $I_1$ to terminal 49. Diode $S_1$ is sometimes referred to as the "forward diode" and preferably has a forward voltage of 1.0 to 1.5 volts.

The forward diode switch $S_1$ has the characteristics that when the forward voltage thereacross is greater than its critical breakdown voltage, it immediately becomes fully conductive and remains in this state until the forward voltage again falls below the critical voltage when conduction immediately stops. The switching takes place substantially instantaneously. Obviously the switch $S_1$ could be a triode, the conductivity of which is controlled by a control voltage applied to a third terminal or any other rapid acting low resistance switch.

To prevent the voltage drop across the choke I from exceeding the forward breakdown voltage of the diode during the time the arc exists and the current is steady, the choke I must have an internal resistance less than that which will produce a voltage drop at the arc current greater than the forward breakdown voltage. When the droplet contacts the weld pool, the resultant short circuit immediately causes an inductive voltage drop across the choke I which immediately exceeds the critical forward voltage of the diode $S_1$ and it immediately conducts. The short circuit current rate of rise immediately becomes that of the power source G, the electrode E and ground leads, as limited by inductor $I_1$ and resistor $R_1$. The current thus rises rapidly to cause the fuse break. As soon as this break occurs, the current commences to drop. The voltage across the choke I not only drops but, because of the stored energy in the inductor, actually reverses its polarity and the reverse diode $S_1$ immediately ceases to conduct. As the voltage increases, it quickly exceeds the breakdown voltage of reverse diode $S_2$, which then becomes conductive. The stored energy in the choke is dissipated through the diode $S_2$ and the arc current drops quite rapidly to its normal value. It is to be noted that the breaking of the short circuit occurs slightly more slowly than the establishment thereof because the wave front of the voltage rise is not as steep. There is thus a small but finite delay before diode $S_2$ conducts. During the resultant interval between the switch $S_1$ ceasing to conduct and the switch $S_2$ conducting, the inductive voltage of the choke appears across the arc helping to reestablish the arc.

This second diode $S_2$ is not necessary to the functioning of the diode $S_1$. It is of value however because by dissipating the stored energy in the choke it causes the arc current to drop much more rapidly, resulting in a lower average arc current. It has a further value because by limiting the reverse voltage across the choke I, the inverse voltage rating of diode $S_1$ may be less at a considerable savings in cost.

The choke I limits the short circuit current rate of rise to a value less than 100,000 amperes per second. The inductance to give such characteristics will vary depending on the inductance of other circuit elements including the source G, and the power leads to the electrode E and workpiece W. In the embodiment shown, the inductance of choke I is preferably 130 uh. Its internal resistance for a 300 ampere welder is 0.0017 ohm and for a 600 ampere welder is 0.0008 ohm. The IR voltage drop is thus less than the forward voltage of diode $S_1$ and it is normally non-conductive. When the switch $S_1$ is closed or conductive, the current divides in amounts inversely proportional to the impedances of the two branches of the circuit. As the dynamic impedance of the choke I is preferably very much higher than that of the switch $S_1$, resistor $R_1$, and inductance $I_1$ in series, the principal increases in the current are through the switch $S_1$. The purpose of resistance $R_1$ is to limit the maximum short circuit current and will vary depending on the desired maximum which is primarily limited by the spatter characteristics of the electrode and its shielding medium. The purpose of choke $I_1$ is to limit the short circuit current rate of rise to any desired value but at least greater than that when switch $S_1$ is open.

The resistance $R_1$ must also be adjusted for various output voltages of the power source G. This resistance may vary from 0 to 0.05 ohm. For an output voltage of 22 volts and a 0.035 inch diameter electrode, a value of 0.025 ohm is preferred.

If the polarity of the power source G is reversed, the polarity of the diodes should be reversed.

Figure 7:
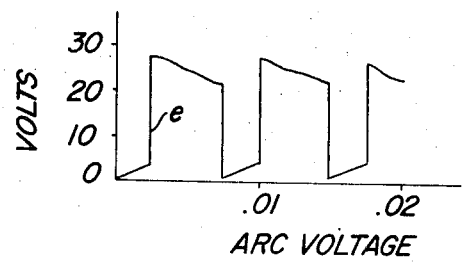
FIG. 7 is an oscillogram similar to those of FIGS. 1 and 2 showing the instantaneous currents and voltages using the present embodiment of FIG. 4 but without diode $S_2$; and, FIGS. 8 and 9 are oscillograms similar to FIG. 7 showing the instantaneous currents and voltages for other embodiments of the invention.
Figure 7:
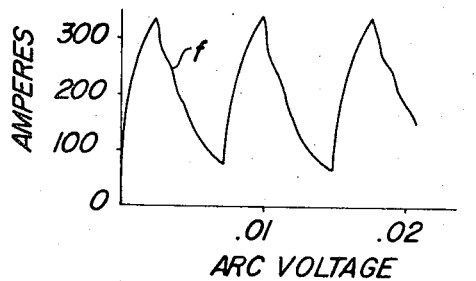
Figure 7:
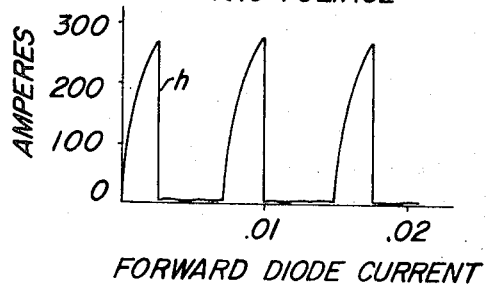
Figure 7:
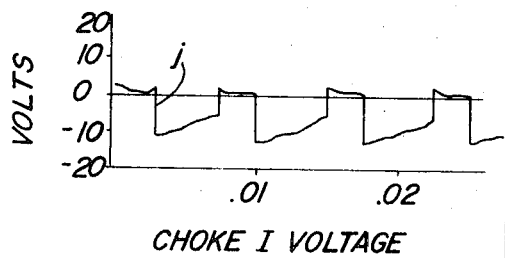

FIG. 7 shows the results obtainable using only switch $S_1$ of the present invention. Thus curves $e$ and $f$ show the instantaneous arc voltage and arc current of curve $h$ shows the forward diode $S_1$ current; and curve $j$ shows the voltage drop across choke I. These curves show that just prior to the short circuit, the arc voltage is approximately 25 volts, the current in the diode $S_1$ is zero, the current in the choke I and the total current is approximately 100 amperes. When the short circuit occurs, the current in the diode $S_1$ rises in approximately 0.0020 second to a value of 270 amperes; and, the total current rises from 100 amperes to 350 amperes. When the fuse break occurs at the end of 0.0025 second and the arc is reestablished, the current in the arc falls exponentially from 350 amperes to 100 amperes. The average current during the time the arc exists (not including the short circuit time) is approximately 210 amperes.

Thus, the diode $S_1$ carries a high, but limited, current sufficient to cause the fuse break to occur very quickly. This latter current flow is limited in duration only by the time required to cause the fuse break and is accurately called a current pulse.

Switching the diode $S_1$ on and off so as to supply this current pulse takes place automatically. It is switched on when the short circuit occurs and the voltage across the choke I exceeds the forward voltage of diode $S_1$. It is switched off when the arc is reestablished because at this instant, the voltage across the choke I instantaneously drops below the diode $S_1$ forward voltage. It is to be emphasized, however, that in this preferred embodiment no switch having mechanical moving parts is required.

Figure 1:
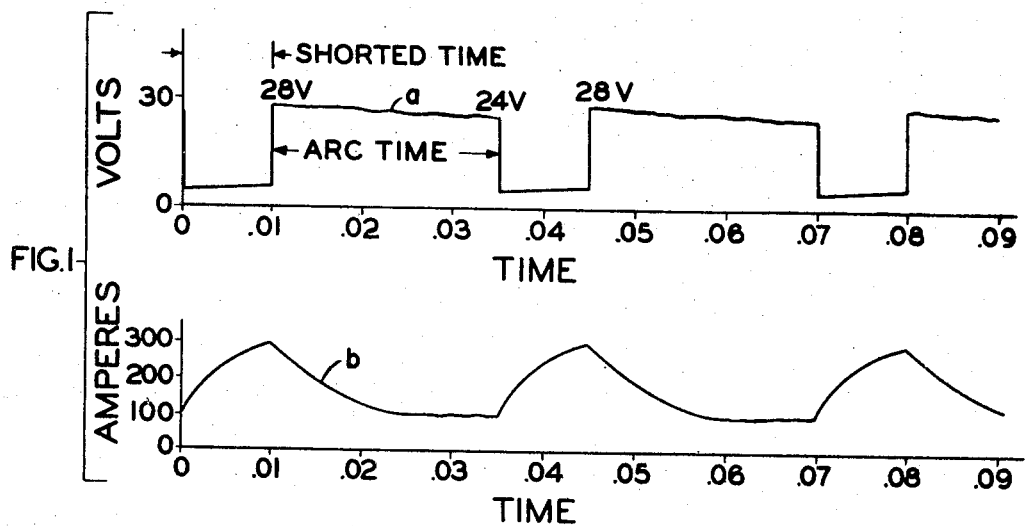
Figure 2:
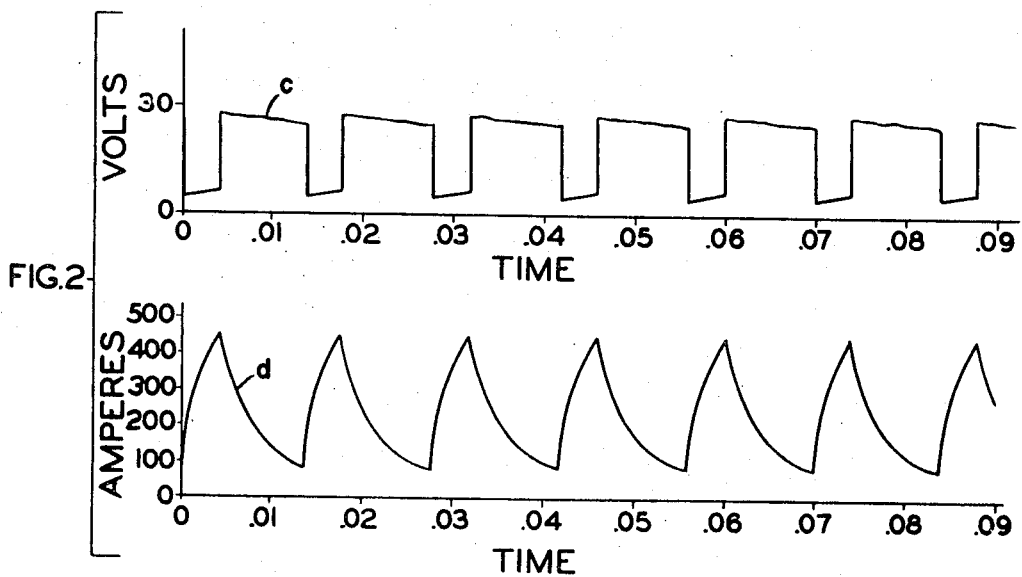

Comparing the oscillograms of FIG. 7 with those of FIGS. 1 and 2, it is to be noted that the short circuit frequency of FIG. 7 is at the rate of about one every 0.007 second, i.e., 142 per second, which is substantially more frequently than those shown in FIG. 1. Additionally in FIG. 7, the ratio of the time of short circuit to the time of one cycle is 1 to 3 whereas in the example of FIG. 1, the ratio is approximately 1 to 3.6 and in FIG. 2 the ratio is approximately 1 to 3.5.

Further, the short circuit period of FIG. 7 is less than the short circuit period of FIG. 2 although it can be made to be the same. Also, the maximum short circuit current of FIG. 7 does not exceed 350 amperes, thus limiting the spatter at the time of the fuse break. It is of further interest to note that the frequency of the current pulse is not a fixed frequency as is the case with the prior art where two power sources are employed, with one being pulsed at a fixed frequency, but instead, is a natural frequency determined by the number of times that the molten droplet shorts the electrode to the weld pool.

The present invention is also of value in starting the arc. At the moment the advancing cold electrode touches the workpiece the point of highest resistance is at the point of contact. Because the electrode is constantly advancing, this resistance will drop rapidly as it is pressed against the workpiece. The current from the power source rises at a rate greatly in excess of 100,000 amperes per second to a value high enough and in a sufficiently brief period of time that before the electrode has had a chance to advance an appreciable distance towards the workpiece, the current is high enough to quickly cause a fuse break which occurs at the point of highest resistance namely, the point of contact.

The power supply of the present invention is equally adaptable to welding with spray type metal transfer without any adjustments except possibly the output voltage. In spray type transfer, there are no periodic short circuits thus the current remains generally constant at a value such that the IR voltage drop across the choke I does not exceed the forward breakdown voltage of diode switch $S_1$. The inductance of choke I is constantly in the circuit and contributes to the stability of the arc.

Figure 8:
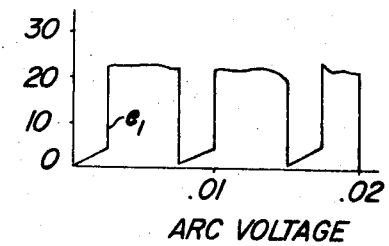
Figure 8:
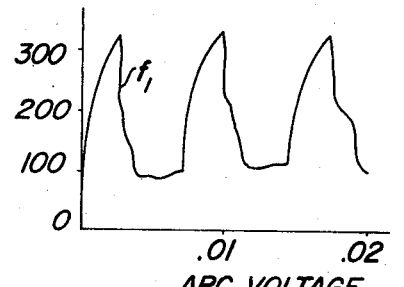
Figure 8:
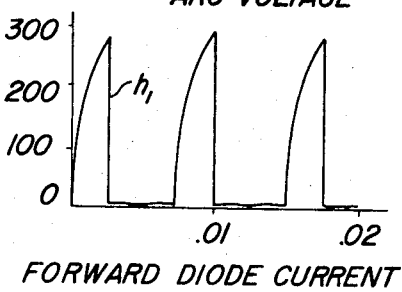
Figure 8:
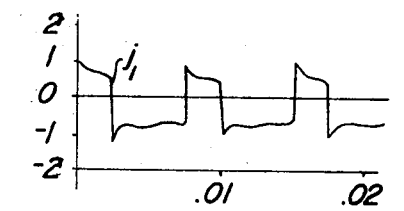
Figure 8:
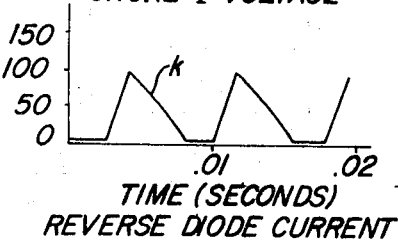

FIG. 8 shows the effect of reverse diode $S_2$ curve $k$ indicating the current therein. In this figure the same letters with the subscript (1) are used to indicate corresponding curves of FIG. 7.

In this figure it will be noted that the current in diode $S_2$ rises at a somewhat slower rate than the rise in current in diode $S_1$ but that its presence cause the instantaneous arc current $f_1$ to fall very rapidly to a value of approximately 200 amperes and then exponentially to approximately 100-125 amperes. The average current is substantially less with the same peak and same minimum current. Because of the more rapid drop in the arc current, the arc voltage $e_1$ during arcing remains almost constant.

Figure 4:
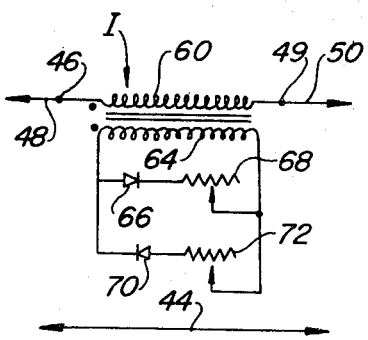
FIG. 4 is a partial schematic diagram showing a preferred embodiment of the invention.

The embodiment of FIG. 3 is helpful in explaining the principals of the invention. FIG. 4 shows a more preferred embodiment of the invention.

In this embodiment the choke I is a transformer having a primary winding 60 which takes the place of choke I of FIG. 3 and connects to terminals 46 and 49. This winding has 10 turns and with its associated core has the required inductance to lower the short circuit current rate of rise to 100,000 amperes per second or less.

Coupled to winding 60 by transformer action is a secondary winding 64 having more turns than the primary winding 60. The turns ratio may be as desired but a secondary to primary ratio of 20 is satisfactory and preferred, i.e., 200 turns. The resistance of the secondary is held to a minimum by using larger diameter copper wire, e.g., No. 14, than would be required for the average currents to be carried. Such a winding in the preferred embodiment has a resistance of 0.65 ohm. Such a resistance gives a sufficiently high rate of rise to take care of all applications presently known.

Connected across the terminals of the secondary 64 is a forward diode 66 in series with a resistance 68 which need not be but is preferably variable from zero to 100 ohms.

Also connected across the terminals of secondary 64 is a reversely polarized diode 70 in series with a resistance 72 similar to resistance 68.

In this embodiment instead of bypassing the current around choke I to raise and lower the short circuit rate of rise, the inductive impedance of the winding 60 is raised and lowered by transformer action, the change in inductance being controlled by the total amount of resistance in the secondary circuit which can be varied from a minimum of 0.65 ohm to 100.65 ohms.

While the operation is much similar to that of the embodiment of FIG. 3, this type of circuit offers advantages and is now preferred. During periods of arcing there is generally a constant DC current in primary 60. No voltage appears across secondary 64. IR voltage drop in winding 60 is unimportant to the operation of the invention.

However, when the short occurs, the increase in current and consequent increase in voltage drop across winding 60 results in a voltage increased by the turns ratio appearing across the secondary 64. This voltage essentially instantaneously exceeds the forward breakdown voltage of forward diode 66 and it conducts essentially shorting secondary 64. This short is reflected back to winding 60 reducing the inductance so that the short circuit current rate of rise immediately increases to well in excess of 100,000 amperes per second.

When the short circuit is broken, an opposite voltage appears across secondary 64. Diode 66 immediately ceases to conduct. The rise in voltage is somewhat slower than when the short occurs. Thus there is a momentary delay before the voltage across diode 70 exceeds its forward voltage. During this instant the inductive voltage of winding 60 appears across the arc helping to reestablish it. Then diode 70 conducts until the inductive energy has been dissipated and the arc current again becomes generally constant. Diode 70 then ceases to conduct.

FIG. 9 shows the voltage current relationships when using the preferred embodiment of FIG. 4. While the arc current $f_2$ is approximately 125 amperes and the arc voltage $e_2$ about 25 volts, the secondary current and thus the current $m_1$ in forward diode 66 rises from zero to a peak of only 17-22 amperes while the current $m_2$ in reverse diode 70 rises in the opposite direction from zero to only a peak of from 5 to 10 amperes. Such currents can be compared to the forward and reverse diode currents of almost 350 amperes and 100 amperes respectively of the embodiment of FIG. 3.

Figure 5:
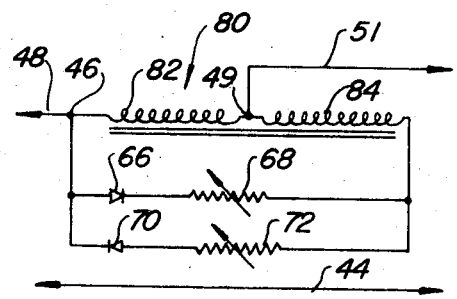
FIGS. 5 and 6 are partial schematic diagrams showing alternative embodiments of the invention.

FIG. 5 shows a further alternative embodiment of the invention wherein the choke and secondary control windings are connected in an auto transformer circuit.

Thus, an auto transformer 80 is provided comprised of windings 82 and 84 connected in electrical series. The free terminal of winding 82 connects to wire 48 at terminal 46 while the common terminal connects to terminal 49 and wire 51. Arc current thus flows only in winding 82. Two circuits each consisting of forward diode 66 in series with resistance 68 and reverse diode 70 in series with resistance 72 are connected across winding 82 and 84 in series.

Changes in current in winding 82 induces voltages in winding 84 which causes the diodes to periodically conduct or act as switches as above described.

Figure 6:
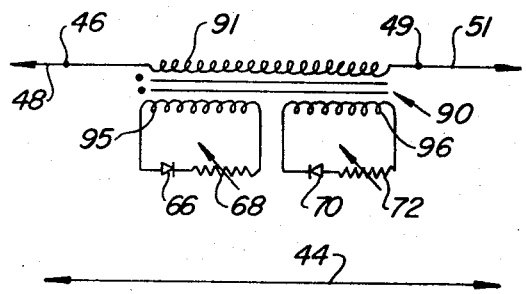

FIG. 6 shows an embodiment similar to the preferred embodiment of FIG. 4 except that a transformer 90 has a primary winding 91 and two secondary windings 95, 96. One secondary winding 95 is shunted by the forward diode 66 and resistance 68 in series while the other secondary 96 is shunted by the reverse diode 70 in series with resistance 72. In this embodiment it is possible to have different turns ratios between the secondary winding 95, 96 and the primary windings 91. The operation is generally identical to the other embodiment.

As can be seen, in all cases, the diodes are reversely polarized for purposes hereinbefore explained. These three embodiments of FIGS. 4, 5 and 6 perform the basic function described in detail in connection with the embodiment of FIG. 3. However, because of the transformer action a more rapid and sensitive control action occurs and the current carrying capacity of the diodes and resistors can be much less. The inductance of the choke or transformer of all the various embodiments can be made adjustable by any known means such as taps on the windings, or varying the amount of iron core associated with the windings.

DEFINITIONS

Open circuit voltage is the voltage delivered by a power source when not delivering current.

Instantaneous voltage is the voltage across the arc which would be read on an oscilloscope or the oscillograph of a high speed recorder with a greatly expanded time base.

Average voltage is that which would be read on a d'Arsonval type meter, incapable of following the rapid pulsations in the voltage caused by the alternate short circuits and arc period.

Instantaneous current is that which would be read on an oscilloscope or the oscillograph of a high speed recorder having a greatly expanded time base.

Average current is that which would be read on a d'Arsonval meter incapable of following the rapid pulsations of the current in each cycle.

Arc current is the current flowing when an actual arc exists between the electrode end and the weld pool.

Short circuit current is the current flowing when the droplet on the end of the electrode is in contact with the weld pool.

Short circuit current rate of rise is the slope of the portion of the current curve at the instant that a short circuit during actual welding is imposed across the terminals of the power source, it being appreciated that this curve is exponential in shape and its slope decreases with time from the instant of the imposing of the short circuit. For practical purposes the rise in current for the first 0.001 second multiplied by 1,000 will be close enough. Alternatively the slope for the first 100/150 amperes of current rise is sufficiently accurate. Thus, a generator having a short circuit current rate of rise of 100,000 amperes per second will rise 100 amperes in 0.001 second, although at the end of 0.003 second, the current will only be 250 amperes. It is further to be noted that the current, if the short circuit is maintained for a prolonged period of time, is the maximum short circuit current of the power source.

When the cross sectional area of an electrode is given, it is intended to include a solid wire or the current carrying section of a cored or tubular electrode.

Using the present invention, improved starting characteristics of the arc have been readily obtained. Once the arc is started, the welding proceeds smoothly with a minimum spatter and the weld pool temperature remains sufficiently low that out-of-position welding and, in particular, overhead welding is readily done.

The invention has been described with reference to preferred embodiments. Obviously, modifications and alternations will occur to others upon reading and understanding of this specification and it is our intention to include all such modifications and alternations insofar as they come within the scope of the appended claims.

We claim:

1. In a power supply for electric arc welding including a DC power source having a ripple content not less than that of multiphase, full wave rectified AC and having a pair of output terminals connected one to said electrode and the other to a workpiece to be welded and having a short circuit current rate of rise in excess of 100,000 amperes per second and a voltage output sufficient to cause an arc between said electrode and said workpiece to melt the workpiece and the electrode whereby a droplet forms on the end of the electrode and wherein said droplet periodically contacts a weld pool and shorts the power supply causing the current to rapidly increase and when the short is broken to rapidly decrease, the improvement which comprises: an inductor in series with one of said output terminals and having an inductance sufficient to reduce the rate of rise to less than 100,000 amperes per second, a diode having a predetermined forward breakdown voltage and connected in electrical parallel with said inductor, said inductor having a resistance sufficiently low that during periods of arcing the voltage drop thereacross is less than the forward breakdown voltage of said diode whereby said diode is non-conducting during arcing and all of the welding current flows through said inductor, and said inductor having an inductance sufficiently high that when the droplet contacts the weld pool the voltage drop across the inductor exceeds the breakdown voltage of the diode whereby the diode conducts and the inductance of said inductor is lowered sufficiently that the short circuit current rate of rise exceeds 100,000 amperes per second.

2. The improvement of claim 1, and a resistor in series with said diode.

3. The improvement of claim 2, and a second inductor in series with said diode and resistor having an inductance less than said inductor.

4. In a power supply for electric arc welding including a DC power source having a ripple content not less than that of multiphase, full wave rectified AC and having a pair of output terminals connected one to said electrode and the other to a workpiece to be welded and having a short circuit current rate of rise in excess of 100,000 amperes per second and a voltage output sufficient to cause an arc between said electrode and said workpiece to melt the workpiece and the electrode whereby a droplet forms on the end of the electrode and wherein said droplet periodically contacts a weld pool and shorts the power supply causing the current to rapidly increase and when the short is broken to rapidly decrease, the improvement which comprises: an inductor in series with one of said output terminals and having an inductance sufficient to reduce the rate of rise to less than 100,000 amperes per second, a first diode having a predetermined forward breakdown voltage, and a second diode having a polarity opposite that of said first diode and a predetermined forward breakdown voltage, means operatively associating said first diode and said second diode so as to be in electrical parallel with one another and with said inductor, said inductor having a low resistance, said first diode being nonconducting during arcing and conducting only after the droplet contacts the weld pool and a voltage drop greater than the IR drop appears across the inductor whereby the inductance of said inductor is lowered sufficiently that the short circuit current rate of rise exceeds 100,000 amperes per second, said second diode being nonconducting at steady or increasing arc currents and conductive only after the short on the power supply is broken and current starts to decrease, said breakdown voltage of said second diode being such that conduction thereof is delayed following breaking of the short to provide a momentary interval during which both said first and second diodes are nonconductive, whereby an instantaneous increase in voltage appears at the electrode to assist in re-establishing the arc.

5. The improvement of claim 4, and a resistor in series with each said first and second diode.

6. The improvement of claim 5, and additional inductances in series one with each of said first and second diodes and the corresponding resistor, said additional inductances each having an inductance less than said inductor.

7. The improvement of claim 4, wherein said first and second diodes are inductively coupled with at least a portion of said inductor.

8. The improvement of claim 7 wherein said inductor is the primary of a transformer having at least one secondary winding, said first and second diodes being connected across the at least a portion of at least one secondary winding.

9. The improvement of claim 8, and a resistor in series with each said first and second diodes.

10. The improvement of claim 8 wherein said transformer has two secondaries, said first and second diodes being connected one across each secondary.

11. The improvement of claim 10, and a resistor in series with each said first and second diodes.

12. The improvement of claim 7 wherein said inductor is the primary of an autotransformer having a secondary, said first and second diodes being connected across said primary and secondary.

13. The improvement of claim 10, and a resistor in series with each said first and second diodes.

* * * * *